US012659149B2

(12) United States Patent
Valecha et al.

(10) Patent No.: US 12,659,149 B2
(45) Date of Patent: Jun. 16, 2026

(54) DYNAMIC SOFTWARE SECURITY OBJECTS

(71) Applicant: International Business Machines Corporation, Armonk, NY (US)

(72) Inventors: Vinod Anandram Valecha, Pune (IN); Rinkesh I. Bansal, Pune (IN); Ramakrishna Gorthi, Chinchwad (IN); Sanjay B. Panchal, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 18/773,251

(22) Filed: Jul. 15, 2024

(65) Prior Publication Data

US 2026/0019251 A1    Jan. 15, 2026

(51) Int. Cl.
    *H04L 9/08*        (2006.01)
(52) U.S. Cl.
    CPC .......... *H04L 9/0891* (2013.01); *H04L 9/0819* (2013.01); *H04L 9/0861* (2013.01)
(58) Field of Classification Search
    CPC .... H04L 9/0891; H04L 9/0819; H04L 9/0861
    See application file for complete search history.

(56) References Cited

U.S. PATENT DOCUMENTS

| 7,555,780 B2 | 6/2009 | Tucker et al. |
| 8,341,406 B2 | 12/2012 | Hildebrand |

| 11,477,182 B2 * | 10/2022 | Bansal ..................... H04L 9/083 |
| 11,716,318 B2 * | 8/2023 | Bhalerao ............. H04L 63/0823 |
| | | 726/6 |
| 11,849,029 B2 | 12/2023 | Bygrave et al. |
| 12,363,168 B1 * | 7/2025 | Luckow ................ H04L 63/101 |
| 2004/0216150 A1 * | 10/2004 | Scheifler ................. G06F 21/64 |
| | | 719/330 |
| 2014/0189783 A1 * | 7/2014 | Kapoor ............... G06F 21/6281 |
| | | 726/1 |

OTHER PUBLICATIONS

Anonymous, "Policy-Based Automated Secrets Management Applied to Distributed Cloud Infrastructure," IP.com Prior Art Database Technical Disclosure No. IPCOM000272009D, Mar. 23, 2023, 10 pages.

(Continued)

*Primary Examiner* — Han Yang
(74) *Attorney, Agent, or Firm* — Michael O'Keefe

(57)        ABSTRACT
A computer-implemented method (CIM), according to one approach, includes determining a first domain of operation associated with a first client, and creating a software security object that satisfies a current standard and/or ruleset associated with the first domain. The method further includes distributing the software security object to the first client, and in response to a determination that the current standard and/or ruleset has been updated, causing the software security object to be updated to conform to the updated standard and/or ruleset. A computer program product (CPP), according to another approach, includes a set of one or more computer-readable storage media, and program instructions, collectively stored in the set of one or more storage media, for causing a processor set to perform any combination of features of the foregoing methodology.

17 Claims, 3 Drawing Sheets

(56) References Cited

OTHER PUBLICATIONS

Wikipedia, "Key (cryptography)," Wikipedia, 2024, 5 pages, retrieved from https://en.wikipedia.org/wiki/Key_(cryptography).
Challener et al., "Secure Authentication for Remote Client Management," IP.com Prior Art Database, Technical Disclosure No. IPCOM000123680D, Apr. 5, 2005, 3 pages.
Arai et al., "Software Security Key," IP.com Prior Art Database, Technical Disclosure No. IPCOM000060575D, Mar. 8, 2005, 4 pages.

* cited by examiner

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SOFTWARE SECURITY OBJECT DETERMINATION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

200

202 — Determine a first domain of operation associated with a first client

204 — Determine a second domain of operation that is associated with the first client 206 — Which of the domains has a greater relative severity?

FIRST

SECOND

208 — Generate a software security object that conforms to standards and/or rulesets associated with the first domain 210 — Generate a software security object that conforms to standards and/or rulesets associated with the second domain To 212

FIG. 2

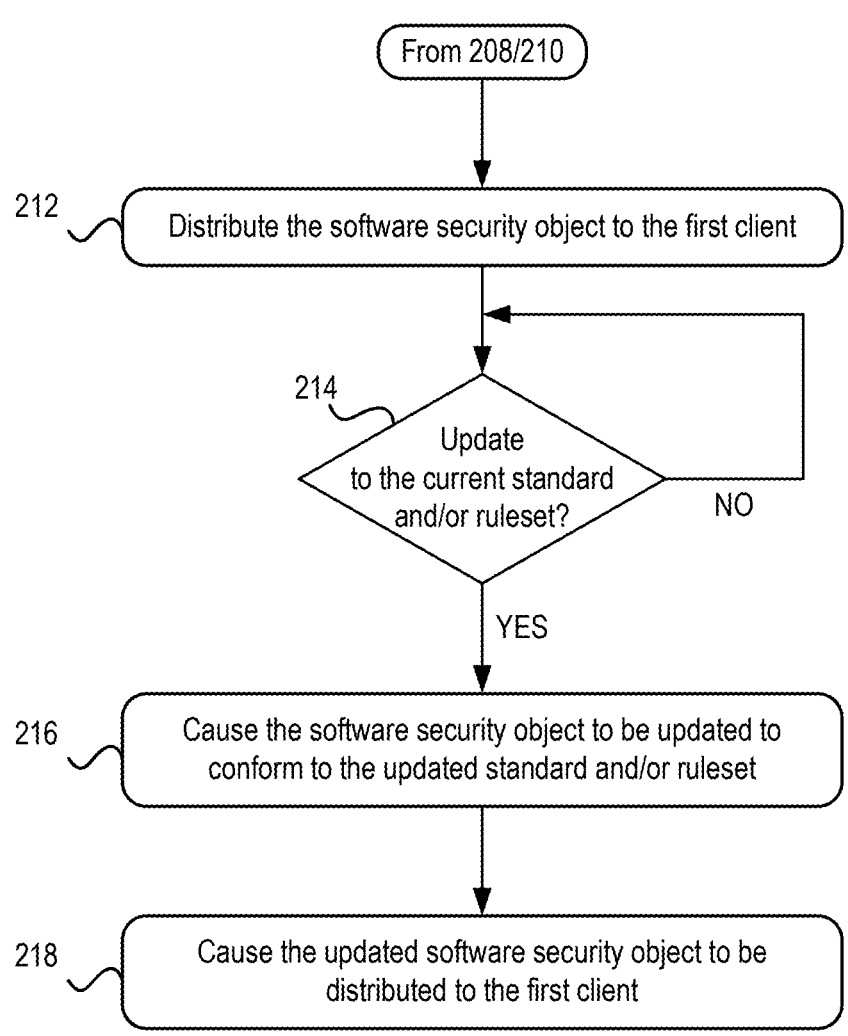
FIG. 2 (continued)

DYNAMIC SOFTWARE SECURITY OBJECTS

BACKGROUND

The present invention relates to software security, and more specifically, this invention relates to use of software security objects such as cryptographic keys.

A cryptographic key is information that is stored in a file, and when used, is proceeded by a cryptographic algorithm in order to encrypt and decrypt sensitive data. The cryptographic key is usually in the form of a string of numbers or letters. Key lifecycle management refers to the creation and retirement of cryptographic keys. This is commonly referred to as "key rollover." A newly generated key is often stored in a key repository along with old keys, e.g., previously used keys that are phased out upon a replacement cryptographic key being generated and distributed. Because placing a key in a distributed repository is not an atomic operation, the new cryptographic key initially becomes available only to a subset of domain controllers. Depending on the repository's replication policy, the key is eventually replicated to the remaining domain controllers over a period. Data protected by the new key may not be usable by all clients until the new key replicates throughout the repository. For example, this may happen if the protected data is stored in a relatively highly available cloud storage that is independent of the key repository.

SUMMARY

A computer-implemented method (CIM), according to one approach, includes determining a first domain of operation associated with a first client, and creating a software security object that satisfies a current standard and/or ruleset associated with the first domain. The method further includes distributing the software security object to the first client, and in response to a determination that the current standard and/or ruleset has been updated, causing the software security object to be updated to conform to the updated standard and/or ruleset.

A computer program product (CPP), according to another approach, includes a set of one or more computer-readable storage media, and program instructions, collectively stored in the set of one or more storage media, for causing a processor set to perform any combination of features of the foregoing methodology.

A computer system (CS), according to another approach, includes a processor set, a set of one or more computer-readable storage media, and program instructions, collectively stored in the set of one or more storage media, for causing the processor set to perform any combination of features of the foregoing methodology.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach of the present invention.

FIG. 2 is a flowchart of a method, in accordance with one approach of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for dynamically updating software security objects based on determined domains of operation.

In one general approach, a CIM includes determining a first domain of operation associated with a first client, and creating a software security object that satisfies a current standard and/or ruleset associated with the first domain. The method further includes distributing the software security object to the first client, and in response to a determination that the current standard and/or ruleset has been updated, causing the software security object to be updated to conform to the updated standard and/or ruleset.

Various beneficial technical effects are enabled as a result of distributing the software security object described above and continuing to update the software security object to conform to updated standard(s) and/or rulesets. One of such technical effects includes the relative heightening of security by incorporating context-based authentication. This delivers at least three key benefits. First, secure authentication for employees, partners, and customers (associated with the client) that need access to various applications, systems, and devices, regardless of their location, is enabled while using the maintained software security object. Second, relatively simple deployment and maintenance for administrators is enabled without impacting end-user productivity. Finally, third, relatively intelligent security policies that limit identity challenges based on login context are enabled. It should be noted that these benefits, which translate to improved performance of environments that use the software security object, would not otherwise be possible based on human behavior, because such software security objects are specifically designed to mitigate manual and computer based access attempts by unauthorized users and devices.

The current standard and/or ruleset associated with the first domain, in some approaches, includes an Information Security Standard (ISO).

Determining a current standard and/or ruleset associated with a domain of operation of a client, e.g., such as the ISO, enables the technical effect of identifying relevant governing principles that the client should adhere to in order to operate lawfully and securely. Without otherwise identifying the current standard and/or ruleset, actions taken in an attempt to protect and secure interests of the client, e.g., such as data used by the client, have the potential for being not on point, and therefore, fail to adequately secure the interests of the client.

The software security object may be a cryptographic key, where the updated standard and/or ruleset includes a plurality of National Institute of Standards and Technology (NIST) standards. Furthermore, a first of the NIST standards may specify a key length minimum requirement of a first number of bits, and a second of the NIST standards may specify a key length minimum requirement of a second number of bits.

A technical effect of causing a software security object to comply with a relatively strictest standard and/or rule includes ensuring that software security objects used by a client comply with all applicable standards and/or rules. This way, a client is not vulnerable to being compromised by a malicious actor that the standards and rules are designed to mitigate.

The method may further include determining that the second number of bits is greater than the first number of bits. Causing the software security object to be updated to conform to the updated standard and/or ruleset may include causing a new cryptographic key having at least the second number of bits to be generated, and causing the new cryptographic key to be distributed to the first client.

A technical effect of causing a software security object to comply with a relatively strictest standard and/or rule, such as a relatively longest key bit length, includes ensuring that software security objects used by a client comply with all applicable standards and/or rules. This way, a client is not vulnerable to being compromised by a malicious actor that the standards and rules are designed to mitigate.

Causing the software security object to be updated to conform to the updated standard and/or ruleset may include issuing an instruction to a key manager to generate the new cryptographic key and distribute the new cryptographic key to the first client.

A technical effect of causing a key manager to update a software security object to comply with a relatively strictest standard and/or rule, such as such as by generating and distributing a new cryptographic key, includes ensuring that software security objects used by a client comply with all applicable standards and/or rules. This way, a client is not vulnerable to being compromised by a malicious actor that the standards and rules are designed to mitigate.

The method may further include determining a second domain of operation that is associated with the first client, where the second domain of operation is different than the first domain of operation. A determination may be made as to which of the domains has a greater relative severity, where the software security object that satisfies the current standard and/or ruleset associated with the first domain of operation is created in response to a determination that the first domain of operation has a greater relative severity than the second domain of operation.

A technical effect of creating a software security object that satisfies the current standard and/or ruleset associated with the domain of operation determined to have a greatest relative severity includes the software security object also satisfying the standards and/or rulesets associated with relatively less severe domains. In other words, because the domain of operation determined to have the greatest relative severity likely has standards and/or rulesets that require relatively more (longer key lengths, keys to be stored separately rather than with other keys, etc.) than the standards and/or rulesets of domains of operation determined to have the lesser relative severity, creating a software security object that satisfies the current standard and/or ruleset associated with the domain of operation determined to have a greatest relative severity ensures that creation of the software security object incorporates a relatively broadest spectrum of security.

The method may further include using Natural Language Processing (NLP) to parse a collection of information that includes potential standards and/or potential rules, using results of the NLP to classify the potential standards and/or potential rules, and grouping different potential standards and/or potential rules based on predetermined classifications, where standards and/or rules within the same grouping have at least a predetermined degree of similarity. The groupings may be compared to a predetermined list associated with the first domain of operation to determine the current standard and/or ruleset associated with the first domain, where the current standard and/or ruleset associated with the first domain is selected from one of the groupings.

A technical effect of grouping and comparing different potential standards and/or potential rules to a predetermined list includes the establishment of a relevant set of standards and/or rules that are relevant to the client's domain of operation, and furthermore, are not outdated. Otherwise using outdated standards and/or rules would unnecessarily consume processing resources of a component performing method 200. Furthermore, otherwise using outdated standards and/or rules in the process of generating a software security object for the client has the potential for inadequately protecting data of the client. Accordingly, these grouping, comparison and selection techniques ensure that the software security object is robust and up to date.

The method may further include distributing the updated software security object to the first client.

A technical effect of distributing the updated software security object to the first client includes the client thereafter being able to use the software security object to protect data, e.g., data that is encrypted using the software security object. Furthermore, because the software security object is generated to comply with current standards and/or rulesets, distribution of the software security object enables the client both adhere to governing standards and/or rulesets while mitigating threats that the standards and/or rulesets aim to address in the first place.

The first domain of operation may include banking, insurance, retail, and telecommunications, and the software security object may include a cryptographic key, a certificate, a keystore, and a trust store.

Determining a relevant domain of operation of a client enables the technical effect of identifying the technical field that normal operations of the client occur in. This identification enables an associated standard and/or ruleset that the client is to adhere to, to be determined. Without otherwise identifying the relevant domain of operation of the client, actions taken in an attempt to protect and secure interests of the client, e.g., such as data used by the client, have the potential for being not on point, and therefore, fail to adequately secure the interests of the client. In contrast, the actions taken as a result of a relevant domain of operation of the client being determined allows for software security objects to be generated in a manner that effectively address threats that the client is likely to experience thereafter within the determined domain of operation.

In another general approach, a CPP includes a set of one or more computer-readable storage media, and program instructions, collectively stored in the set of one or more storage media, for causing a processor set to perform any combination of features of the foregoing methodology. Similar technical effects are obtained.

In another general approach, a CS includes a processor set, a set of one or more computer-readable storage media, and program instructions, collectively stored in the set of one or more storage media, for causing the processor set to perform any combination of features of the foregoing methodology.

In one general approach, a CIM includes determining a first domain of operation associated with a first client, and creating a software security object that satisfies a current standard and/or ruleset associated with the first domain. The method further includes distributing the software security object to the first client, and in response to a determination that the current standard and/or ruleset has been updated, causing the software security object to be updated to conform to the updated standard and/or ruleset and distributing the updated software security object to the first client.

Technical effects are enabled as a result of distributing the software security object described above and continuing to update the software security object to conform to updated standard(s) and/or rulesets includes the relative heightening of security by incorporating context-based authentication. Furthermore, these technical effects mitigate downtime, violations, losses, etc., that would otherwise be experienced by clients if the software security object otherwise failed to adhere to the current standards and/or rulesets.

In one technical use case, a CIM includes determining a first domain of operation associated with a first client, and creating a software security object that satisfies a current standard and/or ruleset associated with the first domain. The method further includes distributing the software security object to the first client, and ongoingly automatically managing updating of the software security object for the client. For example, in response to a determination that the current standard and/or ruleset has been updated, the software security object is caused to be updated to conform to the updated standard and/or ruleset and distributing the updated software security object to the first client.

A technical effect of ongoingly automatically updating and distributing the updated software security object to the first client includes the client thereafter being able to use the software security object to protect data, e.g., data that is encrypted using the software security object. Furthermore, because the software security object is generated to comply with current standards and/or rulesets, distribution of the software security object enables the client both adhere to governing standards and/or rulesets while mitigating threats that the standards and/or rulesets aim to address in the first place. This way, the client does not experience downtime, violations, losses, etc., as a result of the software security object otherwise failing to adhere to the current standards and/or rulesets.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as software security object determination code of block 150 for dynamically updating software security objects based on determined domains of operation. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As mentioned elsewhere above, a cryptographic key is information that is stored in a file, and when used, is proceeded by a cryptographic algorithm in order to encrypt and decrypt cryptographic data. The cryptographic key is usually in the form of a string of numbers or letters. Key lifecycle management refers to the creation and retirement of cryptographic keys. This is commonly referred to as "key rollover." A newly generated key is often stored in a key repository along with old keys, e.g., previously used keys that are phased out upon a replacement cryptographic key being generated and distributed. Because placing a key in a distributed repository is not an atomic operation, the new cryptographic key initially becomes available only to a subset of domain controllers. Depending on the repository's replication policy, the key is eventually replicated to the remaining domain controllers over a period. Data protected by the new key may not be usable by all clients until the new key replicates throughout the repository. For example, this may happen if the protected data is stored in a relatively highly available cloud storage that is independent of the key repository.

Context-based authentication adds flexibility to multi-factor authentication (MFA). Specifically, context-based authentication builds risk assessment capabilities into access decisions by analyzing a user's behavior and context, such as which device or network the user is logging in from. If used successfully, these security measures help to protect resources of a system environment, and furthermore enhance employee login experiences by finding a crucial balance between security and usability that most organizations strive for.

Conventional software security key/certificate creation is static in nature and does not incorporate context into the lifecycle management of cryptographic keys. In order to mitigate the technical issues described above that result in the technical field of software security based on conventional cryptographic key practices being static in nature, the techniques described in approaches herein may be implemented in environments that use cryptographic keys. More specifically, these techniques mitigate these issues by providing a dynamic software security object and management thereof.

Now referring to FIG. 2, a flowchart of a method 200 is shown according to one approach. The method 200 may be performed in accordance with the present invention in any of the environments depicted in FIGS. 1-2, among others, in various approaches. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various approaches, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that, method 200 may be performed in any type of environment in which a software security object, such as a cryptographic key, may be used to protect, e.g., encrypt and/or decrypt, data. In some approaches, such an environment includes at least one client, e.g., a client device such as a computer, and memory that may be used to store the software security object and/or the data. Furthermore, it may be prefaced that, in various approaches described herein, the software security object may be defined as a type of information that may be used to encrypt and decrypt sensitive data. For context, an illustrative definition of "sensitive data" is confidential information that must be kept safe and out of reach from all outsiders unless they have permission to access it. Sensitive data may, in some approaches, include personally identifiable information (PII), sensitive personal information (SPI), copyright information, trademark information or any information which is critical for an individual or an organization. The software security object, in some approaches, is a cryptographic key. In some other approaches, the software security object is a certificate. In yet some other approaches, the software security object is a keystore. In yet some other approaches, the software security object is a trust store. The software security object may, depending on the approach, additionally and/or alternatively include a type of cryptographic information that would become apparent to one of ordinary skill in the art after reading the descriptions herein.

Method 200 includes determining at least one domain of operation associated with a client, e.g., a first client, in order to determine how to generate a relevant software security object for the client. For example, operation 202 includes determining a first domain of operation associated with a first client. For context, a domain of operation may be defined as an industry that a client operates in. This operation preferably includes use of data, and therefore the domain of operation may include a governing field that sets standards and/or rulesets for the client to follow with respect to use of the data. For example, in some approaches, a domain of operation of a client described herein may include banking. In another approach, the domain of operation of a client described herein may include insurance. In yet another approach, the domain of operation of a client described herein may include retail. In another approach, the domain of operation of a client described herein may include telecommunications.

Techniques for determining the domain of operation of a client may, in some approaches, include parsing data associated with operations of the client, e.g., receipts, logs, metadata, advertising, company websites of the client, etc. It should be noted that any such parsing of data is preferably only performed subsequent to gaining explicit permission from the associated client. This parsing may include using Natural Language Processing (NLP) techniques that would become apparent to one of ordinary skill in the art after reading the descriptions herein. Some other techniques for determining the domain of operation of a client may include requesting and/or receiving an indication of the domain of operation from the client, e.g., such as where an indication of the domain of operation is included in a request for a software security object to use that is received from the client.

Domains of operation of one or more clients may change at any time. Accordingly, in some approaches, method 200 includes ongoingly determining at least one domain of operation associated with a client. In some other approaches, method 200 additionally and/or alternatively includes determining at least one domain of operation associated with a client in response to receiving a request from the client for a software security object to use. Some operations described herein may, in some approaches, be performed with respect to a single domain of operation associated with a client. However, in some other approaches, and as will be described in greater detail elsewhere herein, multiple domains of operation may be associated with a client. Accordingly, in one or more of such approaches, at least some of the operations may be performed with respect to multiple domains of operation.

An optional operation of method 200 includes determining a standard and/or ruleset that currently applies to the determined domain of operation. For context, such an operation may be optional because, in some approaches, the standard and/or ruleset that currently applies to the determined domain of operation may also be included in a request that is received from the client. In some other approaches in which the standard and/or ruleset is instead determined, the standard and/or ruleset may be determined by determining a governing body of the determined domain of operation, and furthermore referencing a current standard and/or ruleset of the determined governing body. In some other approaches, a rule engine may be used to determine the standard and/or ruleset, where the rule engine is configured to ongoingly be updated for different standards and/or rulesets for different domains of operation (e.g., such as a table).

The standard and/or ruleset that currently applies to the determined domain of operation may additionally and/or alternatively be determined from a collection of potential standards and/or potential rules. For example, in some approaches, method 200 includes using NLP to parse a collection of information that includes potential standards and/or potential rules. This collection of information may, in some approaches, be a plurality of webpages that are caused to be, e.g., instructed to be, uncovered and parsed by a type of web crawler that would become apparent to one of ordinary skill in the art after reading the descriptions herein. Results of the NLP may be used to classify the potential standards and/or potential rules. In other words, results of text obtained by the web crawler may be mined, e.g., using NLP, to generate different potential standards and/or potential rules. Each of these potential standards and/or potential rules, in some approaches, are identified based on text defining the potential standards and/or potential rules including predetermined keywords, e.g., "include at least", "must include", "security features", "adhere to", etc.

Different potential standards and/or potential rules are preferably grouped based on predetermined classifications. These predetermined classifications may, in some approaches, include data binning variables of a type that would become apparent to one of ordinary skill in the art after reading the descriptions herein. Accordingly, data binning techniques may be performed according to the predetermined classifications in order to group the different potential standards and/or potential rules. Note that, as a result of the grouping, standards and/or rules within the same grouping have at least a predetermined degree of similarity. The groupings are preferably compared to a predetermined list associated with the first domain of operation to determine the current standard and/or ruleset associated with the first domain. In other words, the current standard and/or ruleset associated with the first domain is selected from one of the groupings. In some approaches, the predetermined list defines at least some standards and/or rules that are not to be applied, e.g., considered outdated and therefore are at least temporarily retired. These outdated standards and/or rules are excluded from a selected group in some approaches. In some other approaches, the current standard and/or ruleset associated with the first domain is selected from one of the groupings that does not include any outdated standards and/or rules. In some other approaches, the selection includes use of a predetermined application rule list, wherein the list is associated with applications used by the client. For example, the list may detail rules that use of the applications require, e.g., minimum security standards and/or rules. Accordingly, the list is applied in order to involve a context of standards supported by the client during the process of selecting from the groupings.

A technical effect of grouping and comparing different potential standards and/or potential rules to a predetermined list includes the establishment of a relevant set of standards and/or rules that are relevant to the client's domain of operation, and furthermore, are not outdated. Otherwise using outdated standards and/or rules would unnecessarily consume processing resources of a component performing method 200. Furthermore, otherwise using outdated standards and/or rules in the process of generating a software security object for the client has the potential for inadequately protecting data of the client. Accordingly, these grouping, comparison and selection techniques ensure that the software security object is robust and up to date.

Illustrative examples of the current standard and/or ruleset associated with the first domain may, in some approaches, include an Information Security Standard (ISO). The current standard and/or ruleset associated with the first domain may additionally and/or alternatively include one or more of National Institute of Standards and Technology (NIST) standards. In yet some further approaches, the current standard and/or ruleset associated with the first domain may additionally and/or alternatively be based on a healthcare-based act, e.g., such as the Health Insurance Portability and Accountability Act (HIPAA). Other standards and/or rulesets of one or more types that would become apparent to one of ordinary skill in the art may be associated with the first domain. Determining a current standard and/or ruleset associated with a domain of operation of a client enables the technical effect of enabling the identification of relevant governing principles that the client should adhere to in order to operate lawfully and securely. Without otherwise identifying the current standard and/or ruleset, actions taken in an attempt to protect and secure interests of the client, e.g., such as data used by the client, have the potential for being not on point, and therefore, fail to adequately secure the interests of the client.

For approaches in which method 200 includes determining that the client is associated with only one domain of operation, e.g., the first domain of operation, a software security object that satisfies a current standard and/or ruleset associated with the first domain may be generated. However, in some approaches, the client may be determined to be associated with more than one domain of operation. For example, a second domain of operation that is associated with the first client may be determined, where the second domain of operation is different than the first domain of operation, e.g., see operation 204. In response to a determination that more than two domains of operation are associated with the client, a determination, e.g., see decision 206, is preferably made as to which of the domains has a greater relative severity, e.g., which has a relatively greatest severity. In some approaches, a predetermined list in which respective priorities of different domains are dynamically updated may be referenced in order to make such a determination. In such a predetermined list, in one illustrative approach, an ordering of the severity from relatively most severe to relatively least severe, may include banking, insurance, telecommunications, and then retail.

The predetermined list, in some approaches, is an application rule list that defines different rules that apply, e.g., make up a standard and/or ruleset, for different applications, which may be used by the client. The application rule list is preferably updated when there is any change made to a standard and/or any industry rule has been changed by a regulator. In some other approaches, the application rule list may additionally and/or alternatively be updated in response to a determination that a new standard has been introduced in an associated industry, e.g., an industry of a determined domain of operation.

Method 200 includes creating a software security object that satisfies a current standard and/or ruleset associated with one of the domains. With respect to approaches in which multiple domains exist, once one of the domains of operation that has a greatest relative severity out of all the domains of operation is determined, a software security object may be generated based on the determined domain of operation. For example, in response to a determination that the first domain of operation has a greater relative severity than the second domain of operation, e.g., as illustrated by the "FIRST" logical path of decision 206, a software security object that satisfies the current standard and/or ruleset associated with the first domain of operation is created, e.g., see operation 208. In contrast, in response to a determination that the second domain of operation has a greater relative severity than the first domain of operation, e.g., as illustrated by the "SECOND" logical path of decision 206, a software security object that satisfies the current standard and/or ruleset associated with the second domain of operation is created, e.g., see operation 210.

In some approaches, creating the software security object includes generating a cryptographic key, and the cryptographic key may satisfy the current standard and/or ruleset associated with the determined domain based on the cryptographic key having a length, e.g., number of bits, that meets or exceeds a length requirement specified in the current standard and/or ruleset. In some other approaches, the software security object may satisfy the current standard and/or ruleset associated with the determined domain based on the software security object being caused to be encrypted and/or in another predetermined form while being output to the client. In yet some other approaches, the software security object may satisfy the current standard and/or ruleset associated with the determined domain based on the software security object being stored in a predetermined manner, e.g., stored separately from other software security objects, stored in a predetermined type of secure file and/or container, etc. In yet some other approaches, the software security object may satisfy the current standard and/or ruleset associated with the determined domain based on the software security object adhering to predetermined replication rules, e.g., such as no more than a predetermined number of copies of the software security object being created at a given time.

A technical effect of creating a software security object that satisfies the current standard and/or ruleset associated with the domain of operation determined to have a greatest relative severity includes the software security object also satisfying the standards and/or rulesets associated with relatively less severe domains. In other words, because the domain of operation determined to have the greatest relative severity likely has standards and/or rulesets that require relatively more (longer key lengths, keys to be stored separately rather than with other keys, etc.) than the standards and/or rulesets of domains of operation determined to have the lesser relative severity, creating a software security object that satisfies the current standard and/or ruleset associated with the domain of operation determined to have a greatest relative severity ensures that creation of the software security object incorporates a relatively broadest spectrum of security.

The software security object is distributed to at least the first client, e.g., see operation 212. In some approaches, the software security object is distributed to at least the first client in a reply that is output to the first client in response to receiving a request from the first client requesting a software security object to use. A technical effect of distributing the software security object to the first client includes the client thereafter being able to use the software security object to protect data, e.g., data that is encrypted using the software security object. Furthermore, because the software security object is generated to comply with current standards and/or rulesets, distribution of the software security object enables the client both adhere to governing standards and/or rulesets while mitigating threats that the standards and/or rulesets aim to address in the first place.

Although various approaches herein detail the creation and distribution of a software security object that satisfies a current standard and/or ruleset associated with a determined domain of operation of a client, various operations of method 200 furthermore continue to ensure that the software security object maintains satisfaction of the current standard and/or ruleset, which may change over time. For example, method 200 includes determining whether an update has been made to the current standard and/or ruleset, e.g., see decision 214. In some approaches, the determination of whether an update has been made to the current standard and/or ruleset may be based on whether an update and/or update notification has been received from a service that monitors and tracks a given standard and/or ruleset, e.g., such as a rule engine, a website of a governing body, etc. In some other approaches, the determination of whether an update has been made to the current standard and/or ruleset may be based on whether a non-compliance notification has been received. In some other approaches, a web crawler may be used to search for indications of the current standard and/or ruleset being changed and/or being maintained, e.g., such as an annual announcement.

In response to a determination that an update has not been made to the current standard and/or ruleset, e.g., as illustrated by the "NO" logical path of decision 214, monitoring for such an update optionally continues. This continued monitoring, in some approaches, continues for as long as the client uses the software security object that was distributed to the client, and may optionally end in response to a determination that the software security object is no longer being used.

In response to a determination that the current standard and/or ruleset has been updated, e.g., as illustrated by the "YES" logical path of decision 214, method 200 includes causing the software security object to be updated to conform to the updated standard and/or ruleset, e.g., see operation 216. Various examples that detail the updating performed in operation 216 are described below.

In some approaches, the update of the standard and/or ruleset may cause more than one requirement of a standard to apply. For example, in some approaches in which the software security object is a cryptographic key, the updated standard and/or ruleset may include a plurality of NIST standards. These different standards may specify different requirements of adherence. For example, a first of the NIST standards may specify a key length minimum requirement of a first number of bits, e.g., 1024 bits, while a second of the NIST standards may specify a key length minimum requirement of a second number of bits, e.g., 2048 bits. In such an approach, updating of the software security object to conform to the updated standard and/or ruleset may include determining which of the standards is relatively strictest, and conforming the software security object to satisfy the relatively strictest standard. This way, the relatively less strict standards will also be satisfied by the updated software security object. In the case described above that includes different NIST standards each having a different number of bits, a determination may be made as to which of the standards requires more bits, e.g., determining whether the second number of bits is greater than the first number of bits or the first number of bits is greater than the second number of bits. In response to a determination that the second number of bits is greater than the first number of bits, the software security object is caused to be updated to conform to the updated standard and/or ruleset by causing a new cryptographic key having at least the second number of bits to be generated, e.g., see operation 216. In some approaches, the "new cryptographic key" may be an updated version of the previously distributed cryptographic key (also referred to herein as an "updated software security object"). In contrast, in some other approaches, the "new cryptographic key" may be an entirely new cryptographic key (also referred to herein as a "new cryptographic key"), e.g., not include portions of the previously distributed cryptographic key that are appended to during the updating. Furthermore, the new cryptographic key is caused to be distributed to at least the first client, e.g., see operation 218.

In contrast to the approach above, in some approaches, the standard and/or ruleset may include a plurality of different standards. For example, a determination may be made that the client supports two or more standards at the same time. IN some preferred approaches, the operations of method 200 satisfies the rules for all the standards with the help of a greatest common multiplier rule. More specifically, in one illustrative approach, in response to a determination that the client supports a NIST and a HIPAA standard, where the NIST standard defines that a key length should at a minimum be 1024 bits, and the HIPAA standard defines that the key length needs to be a minimum of 2048 bits, a greatest common multiplier may be used. For example, method 200 may include taking a greatest common multiplier of 1024 and 2048, and defining the key length for the generated key to be 2048 bits to comply with both of the standard. In a practical scenario, the client may have to support more than two standards with complex rules. In such a scenario, the techniques described herein prove useful for compiling with all of the standards the client wants to support.

In some other approaches, a determination may be made that the current standard and/or ruleset has not been updated, yet the software security object may be updated nonetheless in order to comply with one or more standards and/or rules that are determined to apply to the client. For example, in response to a determination that a standard defines that a cryptographic key rotation frequency to six months, the cryptographic key may be rotated/changed every six months via an instruction being issued to a key manager. Furthermore, in response to a determination that the client moves to another applicable standard, the key rotation frequency is adapted to a rule defined in the new standard, and in some approaches, operations are performed to ensure that the client compiles to both of the standards. For example, where a first rule specifies that the cryptographic key be rotated/changed at least every six months, and a second rule specifies that the cryptographic key be rotated/changed at least every three months, the cryptographic key is caused to be rotated/changed at least every three months in order to satisfy both of the rules (which may be on a project-by-project basis of the client), which may include distributing updated or new keys to the client.

Changes that are made to a software security object, e.g., such as in response to a determination being made that the current standard and/or ruleset has been updated, may, in some approaches, be performed in a determined order of severity of the client. For example, assuming that a client has applications running for banking, telecommunications, and retail, method 200 may include determining a severity of the client. This ordering may include, from relatively most severe to relatively least severe, banking, telecommunications, and then retail. Based on this determination, where changes cannot be performed concurrently, method 200 may include causing the changes to a software security object to first satisfy banking-based standards and/or rulesets, and then telecommunication-based standards and/or rulesets, and then retail-based standards and/or rulesets. This way, the techniques described herein identify and protects the sensitive applications first.

In some other approaches, in response to a determination that a central changes the rules for a savings account security key, method 200 may include updating the software security object, e.g., a key, to satisfy the new rule.

The updating of a previously distributed software security object and/or the creation of a new software security object may, in some approaches, be performed by a component that is performing method 200, e.g., a processing circuit, a key manager, etc. In some other approaches, the component performing method 200 may cause the software security object to be updated by issuing an instruction to a component that is configured to generate software security objects. For example, in one of such approaches, causing the software security object to be updated to conform to the updated standard and/or ruleset includes issuing an instruction to a key manager (which may be a type of key generating engine that would become apparent to one of ordinary skill in the art after reading the descriptions herein) to generate the new cryptographic key. In some approaches, the key manager is caused, e.g., instructed, to then distribute the new cryptographic key to at least the first client. In some other approaches, the key manager is additionally and/or alternatively caused, e.g., instructed, to return the new cryptographic key to the component performing method 200, and thereafter method 200 includes distributing the new cryptographic key to at least the first client.

Various beneficial technical effects are enabled as a result of distributing the software security object described above and continuing to update the software security object to conform to updated standard(s) and/or rulesets. One of such technical effects includes the relative heightening of security by incorporating context-based authentication. This context-based authentication includes identifying the nature of a request and mapping the request to a standard that the requesting client wants to comply to and/or is governed by. For example, in response to a determination that the request is for generation of a new cryptographic key and the client currently compiles with an ISO 27k standard, the techniques described herein determine the key rules for ISO 27k and generates the key for the client as per the determined rules.

In some approaches, these rules may involve key length, key rotation frequency, key usage frequency, use of Elliptic Curve Digital Signature Algorithm (ECDSA) certificates, use of Rivest-Shamir-Adleman (RSA) certificates, etc. This delivers at least three key benefits. First, secure authentication for employees, partners, and customers (associated with the client) that need access to various applications, systems, and devices, regardless of their location, is enabled while using the maintained software security object. Second, relatively simple deployment and maintenance for administrators is enabled without impacting end-user productivity. Finally, third, relatively intelligent security policies that limit identity challenges based on login context are enabled. It should be noted that these benefits, which translate to improved performance of environments that use the software security object, would not otherwise be possible based on human behavior, because such software security objects are specifically designed to mitigate manual and/or computer based access attempts by unauthorized users and devices.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), the CIM comprising:
   determining a first domain of operation associated with a first client;
   creating a software security object that satisfies a current standard and/or ruleset associated with the first domain,
   wherein the current standard and/or ruleset associated with the first domain includes an Information Security Standard (ISO),
   wherein the software security object is a cryptographic key;
   distributing the software security object to the first client; and
   in response to a determination that the current standard and/or ruleset has been updated, causing the software security object to be updated to conform to the updated standard and/or ruleset.

2. The CIM of claim 1, wherein the updated standard and/or ruleset includes a plurality of National Institute of Standards and Technology (NIST) standards, wherein a first of the NIST standards specifies a key length minimum requirement of a first number of bits, wherein a second of the NIST standards specifies a key length minimum requirement of a second number of bits.

3. The CIM of claim 2, comprising: determining that the second number of bits is greater than the first number of bits, wherein causing the software security object to be updated to conform to the updated standard and/or ruleset includes causing a new cryptographic key having at least the second number of bits to be generated, and causing the new cryptographic key to be distributed to the first client.

4. The CIM of claim 3, wherein causing the software security object to be updated to conform to the updated standard and/or ruleset includes: issuing an instruction to a key manager to generate the new cryptographic key and distribute the new cryptographic key to the first client.

5. The CIM of claim 1, comprising: determining a second domain of operation that is associated with the first client, wherein the second domain of operation is different than the first domain of operation; and determining which of the domains has a greater relative severity, wherein the software security object that satisfies the current standard and/or ruleset associated with the first domain of operation is created in response to a determination that the first domain of operation has a greater relative severity than the second domain of operation.

6. The CIM of claim 1, comprising: using Natural Language Processing (NLP) to parse a collection of information that includes potential standards and/or potential rules; using results of the NLP to classify the potential standards and/or potential rules; grouping different potential standards and/or potential rules based on predetermined classifications, wherein standards and/or rules within the same grouping have at least a predetermined degree of similarity; and comparing the groupings to a predetermined list associated with the first domain of operation to determine the current standard and/or ruleset associated with the first domain, wherein the current standard and/or ruleset associated with the first domain is selected from one of the groupings.

7. The CIM of claim 1, comprising: distributing the updated software security object to the first client.

8. The CIM of claim 1, wherein the first domain of operation is selected from the group consisting of: banking, insurance, retail, and telecommunications, wherein the software security object is selected from the group consisting of: a cryptographic key, a certificate, a keystore, and a trust store.

9. A computer program product (CPP), the CPP comprising:
   a set of one or more computer-readable storage media; and
   program instructions, collectively stored in the set of one or more storage media, for causing a processor set to perform the following computer operations:
   determine a first domain of operation associated with a first client;
   create a software security object that satisfies a current standard and/or ruleset associated with the first domain,
   wherein the current standard and/or ruleset associated with the first domain includes an Information Security Standard (ISO),
   wherein the software security object is a cryptographic key;
   distribute the software security object to the first client; and
   in response to a determination that the current standard and/or ruleset has been updated, cause the software security object to be updated to conform to the updated standard and/or ruleset.

10. The CPP of claim 9, wherein the updated standard and/or ruleset includes a plurality of National Institute of Standards and Technology (NIST) standards, wherein a first of the NIST standards specifies a key length minimum requirement of a first number of bits, wherein a second of the NIST standards specifies a key length minimum requirement of a second number of bits.

11. The CPP of claim 10, comprising: program instructions, collectively stored in the set of one or more storage media, for causing the processor set to perform the following computer operations: determine that the second number of bits is greater than the first number of bits, wherein causing the software security object to be updated to conform to the updated standard and/or ruleset includes causing a new cryptographic key having at least the second number of bits to be generated, and causing the new cryptographic key to be distributed to the first client.

12. The CPP of claim 11, wherein causing the software security object to be updated to conform to the updated standard and/or ruleset includes: issuing an instruction to a key manager to generate the new cryptographic key and distribute the new cryptographic key to the first client.

13. The CPP of claim 9, comprising: program instructions, collectively stored in the set of one or more storage media, for causing the processor set to perform the following computer operations: determine a second domain of operation that is associated with the first client, wherein the second domain of operation is different than the first domain of operation; and determine which of the domains has a greater relative severity, wherein the software security object that satisfies the current standard and/or ruleset associated with the first domain of operation is created in response to a determination that the first domain of operation has a greater relative severity than the second domain of operation.

14. The CPP of claim 9, comprising: program instructions, collectively stored in the set of one or more storage media, for causing the processor set to perform the following computer operations: use Natural Language Processing (NLP) to parse a collection of information that includes potential standards and/or potential rules; use results of the NLP to classify the potential standards and/or potential rules; group different potential standards and/or potential rules based on predetermined classifications, wherein standards and/or rules within the same grouping have at least a predetermined degree of similarity; and compare the groupings to a predetermined list associated with the first domain of operation to determine the current standard and/or ruleset associated with the first domain, wherein the current standard and/or ruleset associated with the first domain is selected from one of the groupings.

15. The CPP of claim 9, comprising: program instructions, collectively stored in the set of one or more storage media, for causing the processor set to perform the following computer operations: distribute the updated software security object to the first client.

16. The CPP of claim 9, wherein the first domain of operation is selected from the group consisting of: banking, insurance, retail, and telecommunications, wherein the software security object is selected from the group consisting of: a cryptographic key, a certificate, a keystore, and a trust store.

17. A computer system (CS), the CS comprising:

a processor set;

a set of one or more computer-readable storage media; and program instructions, collectively stored in the set of one or more storage media, for causing the processor set to perform the following computer operations:

determine a first domain of operation associated with a first client;

create a software security object that satisfies a current standard and/or ruleset associated with the first domain, wherein the current standard and/or ruleset associated with the first domain includes an Information Security Standard (ISO), wherein the software security object is a cryptographic key;

distribute the software security object to the first client; and in response to a determination that the current standard and/or ruleset has been updated, cause the software security object to be updated to conform to the updated standard and/or ruleset.

* * * * *